E. O. SCHWEITZER.
BRUSH FOR DYNAMO ELECTRIC MACHINES AND THE LIKE.
APPLICATION FILED MAR. 12, 1913.

1,145,926. Patented July 13, 1915.

Witnesses
Hazel Ann Jones.
A. L. Jones.

Inventor
Edmund O. Schweitzer
by A. Miller Belfield
Atty.

UNITED STATES PATENT OFFICE.

EDMUND O. SCHWEITZER, OF CHICAGO, ILLINOIS.

BRUSH FOR DYNAMO-ELECTRIC MACHINES AND THE LIKE.

1,145,926.
Specification of Letters Patent.
Patented July 13, 1915.

Application filed March 12, 1913. Serial No. 753,676.

*To all whom it may concern:*

Be it known that I, EDMUND O. SCHWEITZER, a citizen of the United States, residing at Chicago, in the county of Cook and State of Illinois, have invented a certain new and useful Improvement in Brushes for Dynamo-Electric Machines and the like, of which the following is a full, clear, concise, and exact description, reference being had to the accompanying drawings, forming a part of this specification.

My invention relates to brushes for dynamo electric machines, and the like.

Prominent objects of the invention are to provide a simple and practical type of brush of the class specified; to arrange to secure a highly advantageous coöperation as between the brush and the moving part of the dynamo electric machine; to arrange for a satisfactory mounting of the brush upon the machine; to permit the brush to be easily placed, manipulated and replaced in position; and to accomplish the foregoing and other desirable results in a simple and expeditious manner.

Figure 1:
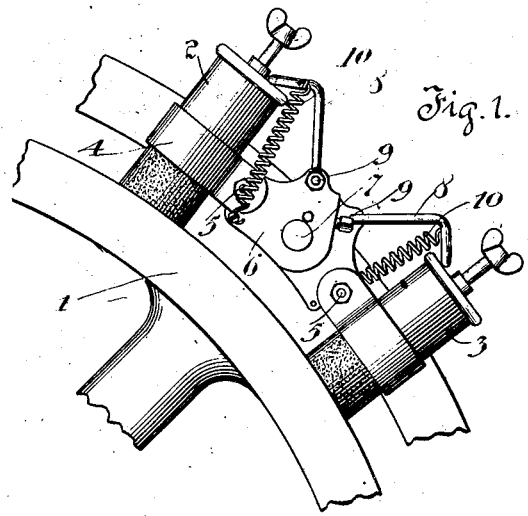
Figure 2:
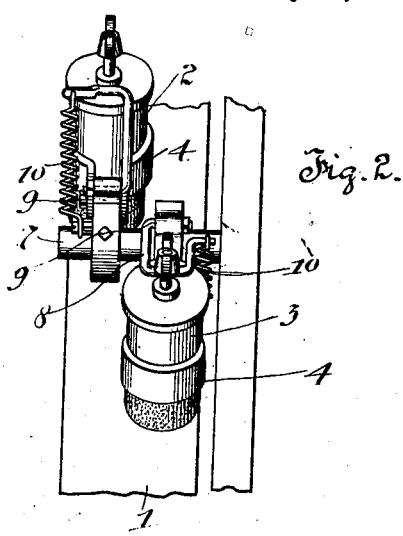
Figure 3:
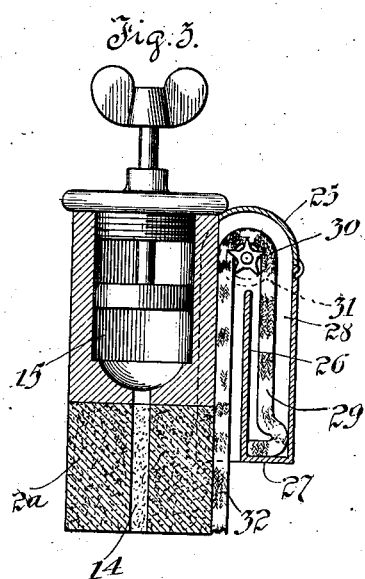
Figure 5:
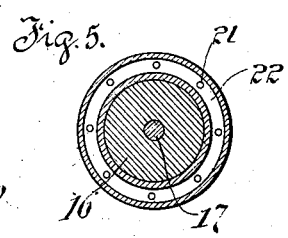
Figure 6:
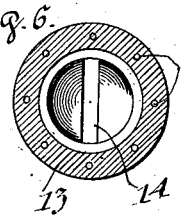
Figure 4:
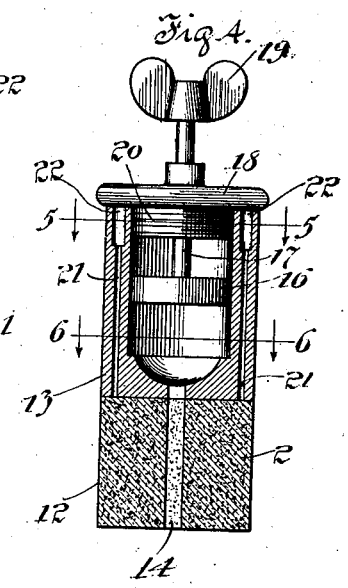
Figure 7:

In the accompanying drawings, Figure 1 is a side elevation of a portion of a dynamo electric machine provided with two brushes embodying my present invention; Fig. 2 is an elevational view of the same; Fig. 3 is a longitudinal section of a brush embodying the invention; Fig. 4 is a similar view of another modification; Figs. 5 and 6 are cross sections on lines 5—5 and 6—6 in Fig. 4; and Fig. 7 is a view of a further modification.

In the drawings Figs. 1 and 2 show a part of a commutator or collector 1, and two brushes 2 and 3 coöperating therewith. Each of the brushes 2 and 3 is shown provided with an annular metal band 4 and these bands 4—4 are shown pivoted at 5—5 to metal mounting elements 6—6. The latter are mounted upon a cross rod or support 7 which is understood to be suitably carried by or mounted upon some part of the frame or other part of the machine.

Each of the brushes 2 and 3 is acted upon to hold it properly in contact with the commutator or ring 1, by swinging arms 8—8 pivotally connected at 9—9 with the members 6—6 and subject to tension of springs 10—10. These arms 8—8 are bent laterally at their outer ends as shown in Fig. 2, so as to have sufficiently long or extended portions or surfaces to rest upon the tops or outer ends of the brushes 2 and 3.

In Figs. 4, 5 and 6, I have shown in detail the brush, which is understood to be mounted in the duplex arrangement shown in Figs. 1 and 2. This brush which I have indicated as 2 is constructed with a lower end or bottom portion 12 of graphite or suitable carbon compound and an upper portion 13 in the form of a metal cylinder. The upper portion and the bottom portion are held together by a suitable cement. The lower portion 2 is provided preferably with a longitudinally extending central passage or duct 14 and the upper portion 13 is provided with a central cylindric chamber 15 whose lower end communicates with the duct or passage 14. A piston 16 is shown mounted in the cylindric chamber 15 and the piston rod 17 is extended out through the top 18 and provided with a winged thumb nut 19. The rod or stem 17 is screw threaded so that by turning the nut 19 the piston 16 is raised or lowered in the chamber 15. The top 18 is preferably threaded at 20 and the interior of the member 13 correspondingly threaded so that said top may be taken off and put in place. The upper member 13 is also desirably provided with longitudinally extending ducts or passages 21—21 which terminate at their lower ends at the upper surface or end of the graphite lower part 12 and which terminate at their upper ends in an annular chamber 22 which is open at its upper end at the upper surface of the member 13.

Into the cylindric chamber 15 I desirably place a sufficient quantity of lubricating material, such for example as powdered graphite, carbon, or oil, and in the outer annular chamber 22 I desirably place lubricating material of greater fluidity, such as ordinary lubricating oil. The less fluid material in the inner chamber is forced or driven down through the central duct or passage 14 to the wearing surface of the brush, whereas the more fluid lubricating material, which I term the liquid, runs down from the chamber 22 into the ducts 21—21 to the graphite part 12 and then trickles or works through the latter to the wearing surface of the brush. Thus I provide or supply two different lubricants and so gain the several various advantages which accrue from each, and also secure the further advantage of using the two together.

In Fig. 3 I have shown a modified form of brush 2ᵃ which is similar to the brush 2 in that it has the chamber 15, passage 14, and coöperating instrumentalities but is different from the brush of Figs. 4, 5 and 6, in that it does not have the annular recess or reservoir 22 with passages 21—21 leading down therefrom. On the other hand, it has a supplemental box-like structure 25 arranged longitudinally on one side of the brush and adapted to serve as a reservoir for liquid or flowing lubricant. To such end it is provided with an upwardly extending inner wall 26, and bottom 27, which with the outer wall form a reservoir 28 in which is confined a wick 29. The latter is extended upwardly out of said reservoir and over a rotary toothed member 30 which is provided with a suitable finger wheel 31 for manipulation of the fingers and thence said wick extends downwardly as shown at 22 along the side of the brush and to the wearing surface of the commutator or ring. This arrangement also provides the viscous and liquid or flowing lubricant.

In Fig. 7 I show an arrangement very similar to the device of Figs. 4, 5 and 6, the device of Fig. 7 having passages 21ᵃ which extend not only through the upper member 13, but also through the lower graphite member 12 to the wearing surface of the brush and commutator.

In my Patent No. 974,833 issued to me November 8, 1910 for brush for dynamo electric machines and the like, I have shown a brush somewhat similar to the brush disclosed in this application, but it will be observed that the brush of my said patent does not embody all the features of the invention herein set forth.

It will be understood that changes and modifications can be made without departing from the spirit of the invention.

What I claim is:

1. A brush of the class specified, comprising reservoirs for lubricants of different degrees of fluidity, and means for forcing the less fluid lubricant from its reservoir.

2. A brush of the class specified, comprising reservoirs for lubricants of different degrees of fluidity, and a piston or plunger with means for moving the same so as to force the less fluid lubricant from its reservoir.

3. A brush of the class specified, comprising an upper metallic portion and a lower graphite portion, the upper metallic portion having reservoirs associated therewith for two lubricants of different degrees of fluidity, and the lower portion being provided with a duct or passage from the less fluid lubricant reservoir to the wearing surface of the brush, and means for forcing the said lubricant from the reservoir therefor into and through said passage.

4. A brush for dynamo electric machines having means for applying liquid lubricant to the commutator in advance of the contact surface of the brush and commutator.

5. A brush for dynamo electric machines, comprising a carbon compound contacting portion and means for applying liquid lubricant to the commutator in advance of the surface of contact of the brush and commutator.

6. A brush for dynamo electric machines, having a central reservoir with a duct or passage leading therefrom to the wearing surface of the brush, and means for forcing material from said reservoir into and through said passage, said brush also having means for supplying liquid lubricant to the wearing surface of the brush.

7. A brush for dynamo electric machines having a central reservoir with a duct or passage leading therefrom to the wearing surface of the brush, means for forcing material from said reservoir into and through said passage, and means for supplying liquid lubricant to the lower portion of the brush.

8. A brush for dynamo electric machines, provided with a reservoir for liquid lubricant, and a wick extending down from said reservoir to the lower portion of the brush.

9. A brush for dynamo electric machines provided with an exteriorly secured box forming a reservoir, and a wick extending from said reservoir toward the wearing surface of the brush.

10. A brush for dynamo electric machines, comprising an upper metallic part and a lower part made of carbon compound, the upper part being provided with a reservoir and a passage leading from said reservoir to the wearing surface of the brush, a plunger with a threaded rod extended through the top of said reservoir, a box secured to the side of the brush and forming a supplemental reservoir, and a wick extending from said supplemental reservoir to and along the side of the brush.

In witness whereof, I hereunto subscribe my name this 28th day of February, A. D.; 1913.

EDMUND O. SCHWEITZER.

Witnesses:
A. L. JONES,
H. A. JONES.